(12) United States Patent
Kumar et al.

(10) Patent No.: US 12,431,307 B2
(45) Date of Patent: Sep. 30, 2025

(54) PRESSURE-ACTUATED SWITCH FOR COMPRESSORS

(71) Applicant: WIKA Alexander Wiegand SE & Co. KG, Klingenberg (DE)

(72) Inventors: Ashish Kumar, Ambala (IN); Umang Gupta, Ghaziabad (IN)

(73) Assignee: Wika Alexander Wiegand SE & Co. KG, Klingenberg (DE)

( * ) Notice: Subject to any disclaimer, the term of this patent is extended or adjusted under 35 U.S.C. 154(b) by 208 days.

(21) Appl. No.: 18/222,041

(22) Filed: Jul. 14, 2023

(65) Prior Publication Data

US 2024/0021385 A1 Jan. 18, 2024

(30) Foreign Application Priority Data

Jul. 15, 2022 (DE) ..................... 10 2022 117 779.3
Jul. 22, 2022 (DE) ..................... 10 2022 118 441.2

(51) Int. Cl.
*H01H 35/34* (2006.01)
*H01H 35/00* (2006.01)
*H04L 9/40* (2022.01)
*H04L 67/12* (2022.01)

(52) U.S. Cl.
CPC ........ *H01H 35/343* (2013.01); *H01H 35/006* (2013.01); *H04L 63/12* (2013.01); *H04L 67/12* (2013.01)

(58) Field of Classification Search
CPC .... H01H 35/343; H01H 35/006; H01H 9/167; H01H 35/2614; H01H 2300/03; H01H 35/2635; H01H 35/2642; H01H 35/34; H01H 35/00; H04L 63/12; H04L 67/12; H04L 9/40
See application file for complete search history.

(56) References Cited

U.S. PATENT DOCUMENTS 3,930,134 A * 12/1975 Rostron ................. H01H 33/32
 91/416
7,297,885 B2 * 11/2007 Lee ........................ H01H 35/34
 200/81 R

* cited by examiner

*Primary Examiner* — Lheiren Mae A Caroc
(74) *Attorney, Agent, or Firm* — Muncy, Geissler, Olds & Lowe, P.C.

(57) ABSTRACT

A pressure-actuated switch having a pressure port, a diaphragm, a range spring, an actuator plate, a differential plate, and an electrical switch. A certain pressure level moves the diaphragm against the range spring at the pressure port and thus deflects the actuator plate. The actuator plate is coupled to the electrical switch via a snap spring, wherein the electrical switch can be switched on or off via the deflection of the actuator plate and the snap spring. The differential plate controlled by a differential spring is connected to the actuator plate and supports the actuator plate in a first portion of movement, wherein the differential plate is decoupled from the actuator plate in a second portion of movement of the actuator plate.

15 Claims, 5 Drawing Sheets

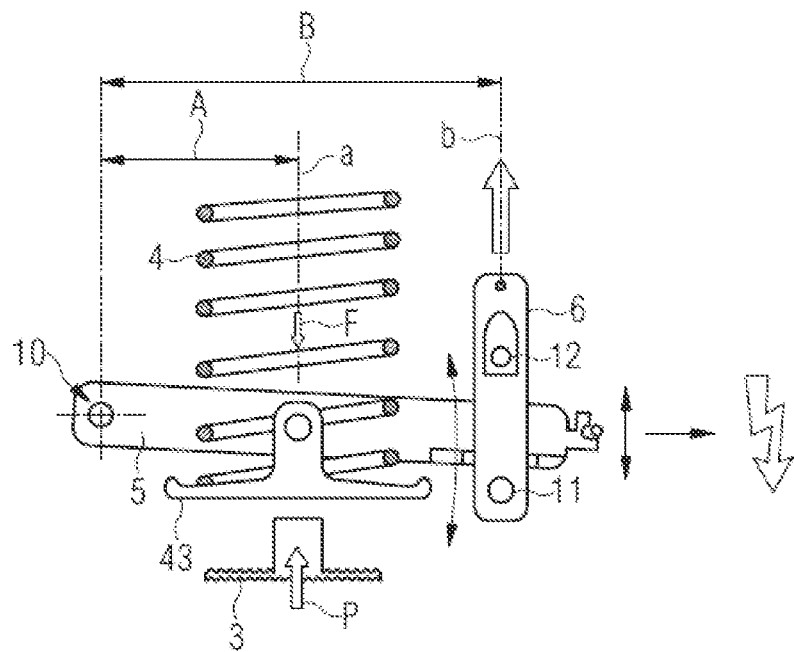

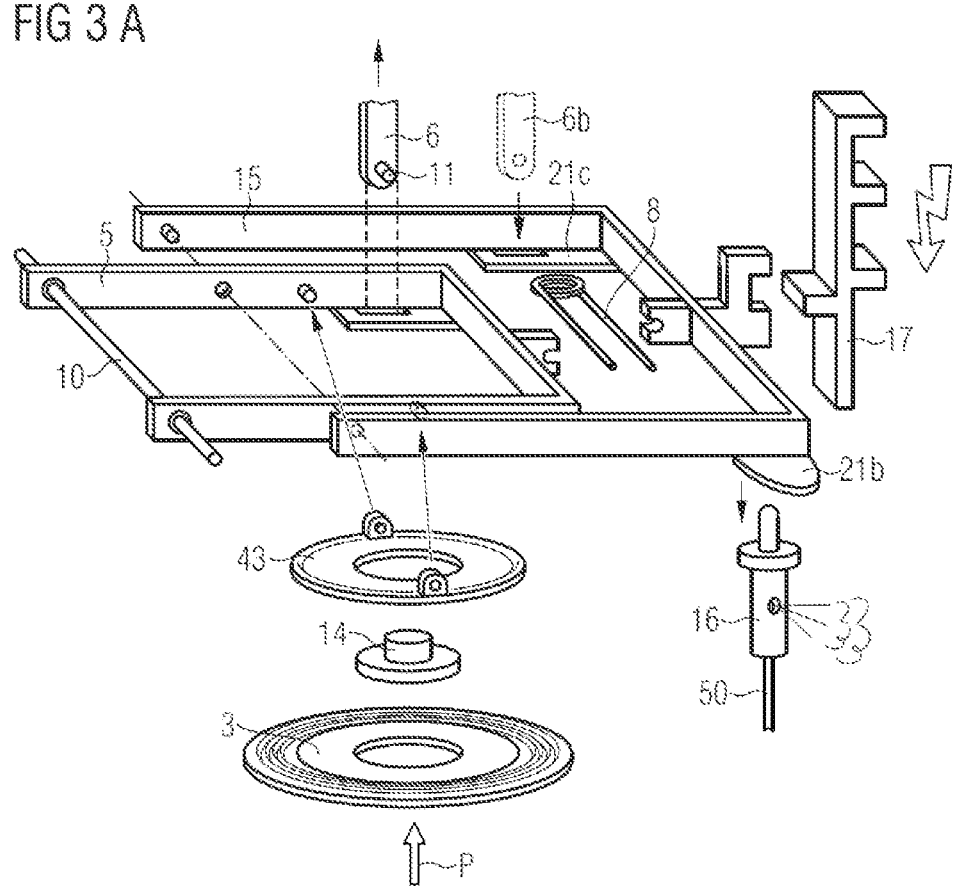

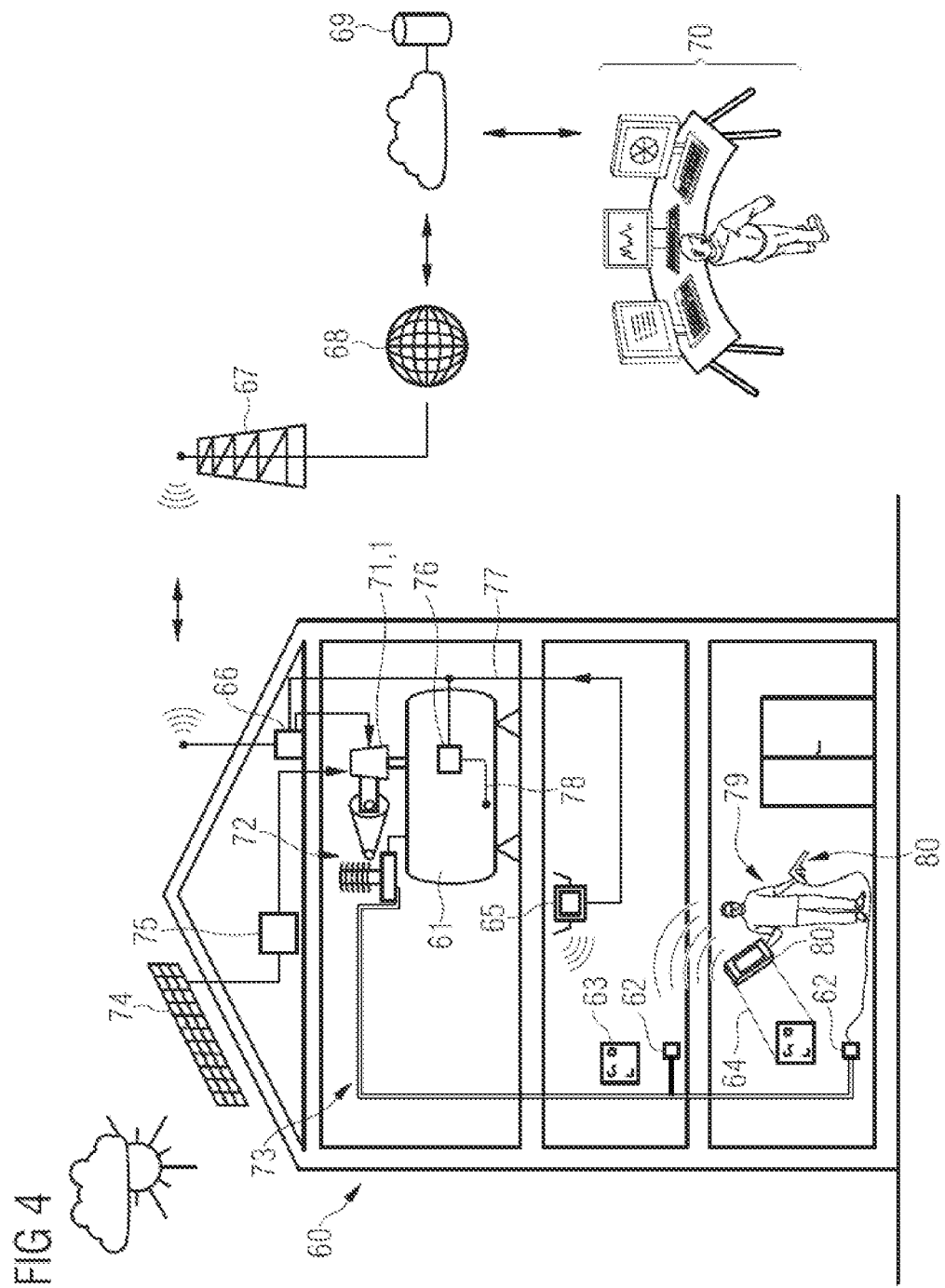

PRESSURE-ACTUATED SWITCH FOR COMPRESSORS

This nonprovisional application claims priority under 35 U.S.C. § 119(a) to German Patent Application No. 10 2022 117 779.3, which was filed in Germany on Jul. 15, 2022, and to German Patent Application No. 10 2022 118 441.2, which was filed in Germany on Jul. 22, 2022, and which are both herein incorporated by reference.

BACKGROUND OF THE INVENTION

Field of the Invention

The present invention relates to a pressure-actuated switch for compressors.

Description of the Background Art

Pressure-actuated switches are generally known from the prior art, which are used, for example, to switch compressors on and off.

SUMMARY OF THE INVENTION

It is therefore an object of the present invention to provide a pressure-actuated switch.

The pressure-actuated switch according to the invention comprises a pressure port, a diaphragm, a range spring, an actuator plate, a differential plate and an electrical switch. A certain pressure level at the pressure port moves the diaphragm against the range spring and thus deflects the actuator plate. The actuator plate is coupled to the electrical switch via a snap spring, wherein the electrical switch can be switched on or off via the deflection of the actuator plate and the snap spring. The differential plate, which is controlled by a differential spring, is connected to the actuator plate and supports the actuator plate in a first portion of movement. The differential plate is decoupled from the actuator plate in a second portion of movement of the actuator plate.

The present pressure-actuated switch is characterized by an improved switching behavior. In particular, precision and tolerance with regard to a pressure to be switched is improved by the present pressure-actuated switch. Thus, by means of the pressure-actuated switch, reliable switching of current or high current for compressors is possible.

The actuator plate can have an outer axis and the range spring and the pressure at the pressure port act via the diaphragm and/or a piston at a first point of the actuator plate. The differential plate engages at a second point on the actuator plate, wherein the first position is closer to the axis than the second position. By arranging the outer axis outside a symmetry axis of the range spring, a lever arm with a particularly large deflection is achieved, which in turn has a positive effect on the shifting behavior.

The differential plate can engage with the actuator plate via a differential rivet pin, which is decoupled from the actuator plate in one position of the pressure-actuated switch.

The differential plate can have a free area, wherein a differential stop engages in the free area. The differential plate is limited in its movement by the differential stop or a differential stop screw or an adjusting screw that rests against a protrusion of the differential plate in an adjustable stop position. This makes it possible, for example, to set different switching points for switching the electrical switch on and off.

The differential plate can be moved by an adjustable differential spring or is movable by it, wherein an elongation of the differential spring is set or can be set by a differential spindle. For example, it is possible to implement different switching points for switching the electrical switch on and off.

The actuating pressure can be adjusted by means of compression exerted on the range spring by a range spindle. This enables reliable use of the pressure switch in a wide pressure range.

The actuator plate can be surrounded by a snap arm of the electrical switch. This arrangement is particularly space-saving, which means that a much smaller installation space is required as compared to conventional pressure switches.

The snap arm can be U-shaped. Due to the U-shaped design of the snap arm, a particularly stable and at the same time space-saving design of the pressure switch is possible.

The actuator plate can be U-shaped. For example, it may also be provided that the U-shaped actuator plate is smaller as compared to the U-shaped snap arm. This makes it possible for the two components (actuator plate and snap arm) to interlock, which enables a particularly small design of the pressure-actuated switch.

A relief valve can be held by a bracket as part of the snap arm during switching of the electrical switch.

The actuator plate of the pressure-actuated switch can have a bracket and the differential plate or another differential plate is brought into engagement with the bracket via an outer overdrive knob or a remote-controlled magnet-driven or motor-driven unit connected via Bluetooth, APL, cloud-based data-driven switching events, or via a mobile phone operation, in particular a QR code operation.

The snap arm can have a bracket and the differential plate or another differential plate is engaged with the bracket via an external overdrive knob or a remotely controlled magnet-driven or motor-driven unit connected via Bluetooth, APL, cloud-based data-driven switching events, or via a mobile phone operation, in particular a QR code operation. A wireless connection and/or remote control of the pressure-actuated switch is particularly advantageous when using the pressure-actuated switch in a hazardous environment. For example, the switching off and on of a compressor, which is under high pressure or is used in a potentially explosive area, can be controlled remotely.

An intelligent field device with at least one switching function comprises at least one pressure-actuated switch with the features and possible embodiments described above. Alternatively, the intelligent field device can also include a sensor-controlled switch. This can be, for example, at least one sensor, in particular an electronic pressure sensor and/or an electronic temperature sensor, which is arranged in a housing. A processing unit is provided for processing the measured values. If, for example, a pressure in a compressor reaches a preset limit, an electrical switch is triggered or closed and a pump of the compressor is switched off. If the pressure drops below the limit, the switch opens and the pump of the compressor ensures that the pressure in the compressor rises.

Furthermore, the intelligent field device can include a power supply unit, which is, for example, wired via a current loop. Alternatively or in addition to this, a power supply via a permanently installed battery can also be provided. Furthermore, the field device comprises an electronic unit, wherein the electronic unit has a communication unit with at least one radio module. In particular, the radio module is designed to exchange data wirelessly with one or more external servers independently of each other. For example, the radio module can send and receive data via protocols such as Bluetooth, WLAN, LoRaWAN, Wireless HART. When data is sent from the intelligent field device to at least one server, at least one verification code is attached or processed. Furthermore, it may be provided that a previously defined security code is regularly queried or verified between the transmitting and receiving points. Both the intelligent field device and the at least one server can each perform the function as a transmitting and/or receiving point. With the regular exchange and retrieval of security codes, particularly tamper-proof and protected communication between the intelligent field device and connected servers or mobile devices is to be achieved.

A method for the safe operation of an intelligent field device with at least one switching function includes a pressure-actuated switch according to the features and possible embodiments described above or a sensor-controlled switch as described previously. Furthermore, an independent power supply unit, for example in the form of a rechargeable battery, is provided. Alternatively, the power supply can also be wired, for example via a loop current or similar.

An electronic unit can also be provided, wherein the electronic unit has a communication unit with at least one radio module, which is designed to exchange data wirelessly with one or more external servers independently of each other. During a transmission process, the field device sends measured values in the form of defined, digital data packets to at least one server. During the sending process, at least one verification code is attached to each data packet or the data packet is encrypted or processed with a verification code. The verification code is generated by a random number generator or a crypto unit with a second hardware-based key in the electronic unit, so that an asymmetric encryption method can be implemented, for example. The at least one verification code is checked by the at least one server, and then passed on to a higher-level control room with a positive inspection characteristic. Certificates and/or signatures, for example, can also be used for authentication between the intelligent field device and the at least one server.

The intelligent field device may communicate with at least two independent servers, wherein a verification code is attached to each data packet during each transmission process or the data packet is encrypted with a verification code. For example, when communicating with the one first server, the verification code remains unchanged each time it is sent. When communicating with the one second server, the verification code is regenerated by the crypto generator or crypto unit for each sending process. Both verification codes must first be processed and then confirmed independently of each other by the at least two servers. The verification codes confirmed by the servers are compared in the electronic unit. If an incorrect and/or missing confirmation of at least one server is detected, the intelligent field device switches to a safe operating mode and/or prevents communication with the faulty server. This ensures the most reliable and trouble-free operation of the field device. In the event of a server failure, the field device can continue to communicate with another independent server or operate independently of the servers in the safe operating mode. The safe operating mode is a programmed setting that can be activated in the event of errors of any kind. Often, this can also be associated with the shutdown/power-down of an industrial plant.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2 shows, schematically, a section of the pressure-actuated switch according to FIG. 1 in the area of an actuator plate, FIGS. 3a and 3b show, schematically, a section of the pressure-actuated switch according to FIG. 1 in the area of an actuator plate, and FIG. 4 shows, schematically, a plant.

DETAILED DESCRIPTION

Figure 1:
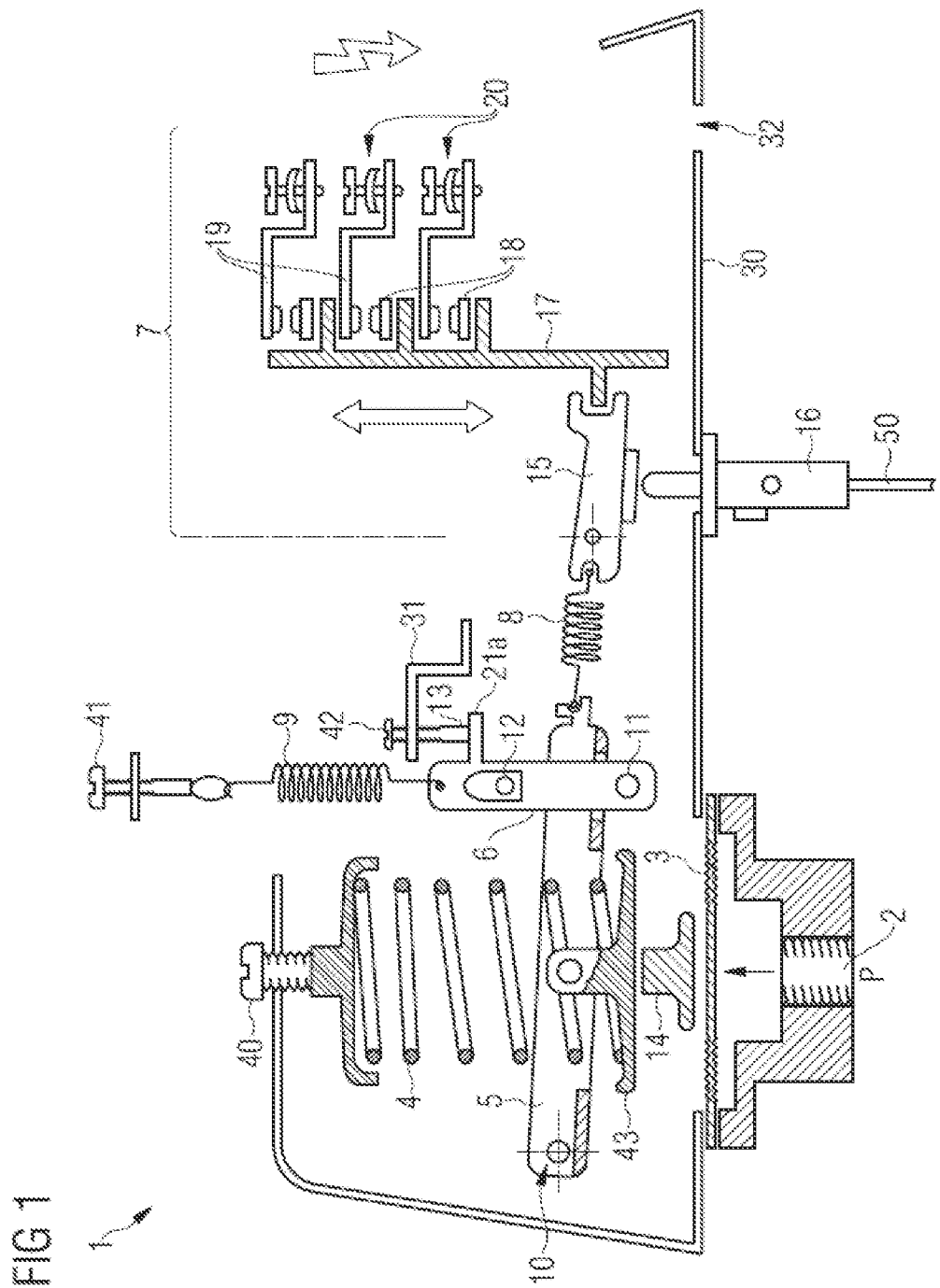
FIG. 1 shows, schematically, a cross-sectional representation of a pressure-actuated switch.

FIG. 1 shows a cross-sectional representation of a possible embodiment of a pressure-actuated switch 1 with a pressure port 2, which is connected via a pipe or hose to, e.g., a compressor. The pressure-actuated switch 1 is provided in a housing 30 having a cable input/output opening 32.

The switch 1 comprises a diaphragm 3 to transmit a pressure-related force to a range spring 4 via a spring seat 43 and/or a piston 14. An actuator plate 5 is mounted on an axis 10 and is swiveled under a pressure-related movement of the spring seat 43. The snap arm 15 is mounted either so as to rotate on a housing via two axis points or alternatively rotatably via two axis points on the actuator plate 5.

The differential plate 6 uses a rivet pin 11 to engage either with the actuator plate 5 or the snap arm 15. The differential plate 6 is loaded by a differential spring 9 on tension. An elongation of the differential spring 9 is set or can be set by a differential spindle 41. In the event of an increase in pressure, the lifting movement of the diaphragm 3 is transmitted via this mechanism in a lever-like manner in the direction of an electrical switch 7.

The actuator plate 5 drives the electrical switch 7 via a snap spring 8 and the snap arm 15, whereby a compressor, for example, can be switched on or off in a pressure-controlled manner: Thus, at a certain pressure level at the pressure port 2, the diaphragm 3 and the piston 14 are driven and the spring seat 43 is pressed against the range spring 4. At a set pressure point, a tipping point can be reached via the snap spring 8 and the electrical switch 7 is actuated, wherein a consumer, for example the compressor, can be switched on or off. The electrical switch 7 includes a carrier 17 movable terminals 18, stationary terminals 19 and a terminal block 20.

For this purpose, the differential plate 6 is loaded by the differential spring 9, for example, under tension. Further, the differential plate 6 is connected to the actuator plate 5 and supports the actuator plate 5 in a first portion of movement in front of the switching point.

In a second portion of movement, the differential plate 6 is decoupled from the actuator plate 5. In the process, a differential stop 12, which is guided in a slotted hole cut-out of the differential plate 6, enters a stop position, which prevents further movement of the differential plate 6. The differential rivet pin 11 then no longer engages with the actuator plate 5 but runs freely. The differential plate 6 is limited in its movement by the differential stop 12, or a differential stop screw 13 or an adjusting screw 42, mounted in a mounting bracket 31, that rests against a protrusion 21a of the differential plate 6 in an adjustable stop position.

Furthermore, only the range spring 4 acts on the actuator plate 5, so interference from the differential spring 9 is decoupled. The actuating pressure can be adjusted by compression exerted on the range spring 4 by a range spindle 40.

On the right side of FIG. 1, the electrical switch 7 is shown schematically. The snap spring 8 engages with the snap arm 15 and establishes a connection or coupling to the actuator plate 5.

FIG. 2 shows the principle of forces by a possible embodiment of the actuator plate 5 according to FIG. 1.

Pressure-induced forces act on the actuator plate 5 via the diaphragm 3 or the piston 14 at a first position a or at a first distance A to the axis 10. The differential plate 6 may engage or act on the actuator plate 5 at a second position b or a distance B to the axis 10, wherein the position a is closer to the axis 10 than the position b.

FIG. 3a shows that the actuator plate 5 can be U-shaped. The snap arm 15 can also include the actuator plate 5 in the U-shape. In this case, the snap arm 15 is mounted on the actuator plate 5. A relief valve 16, connected to a relief valve connection 50, can be held by a bracket 21b as part of the snap arm 15 during switching of the electrical switch.

Figure 3B:
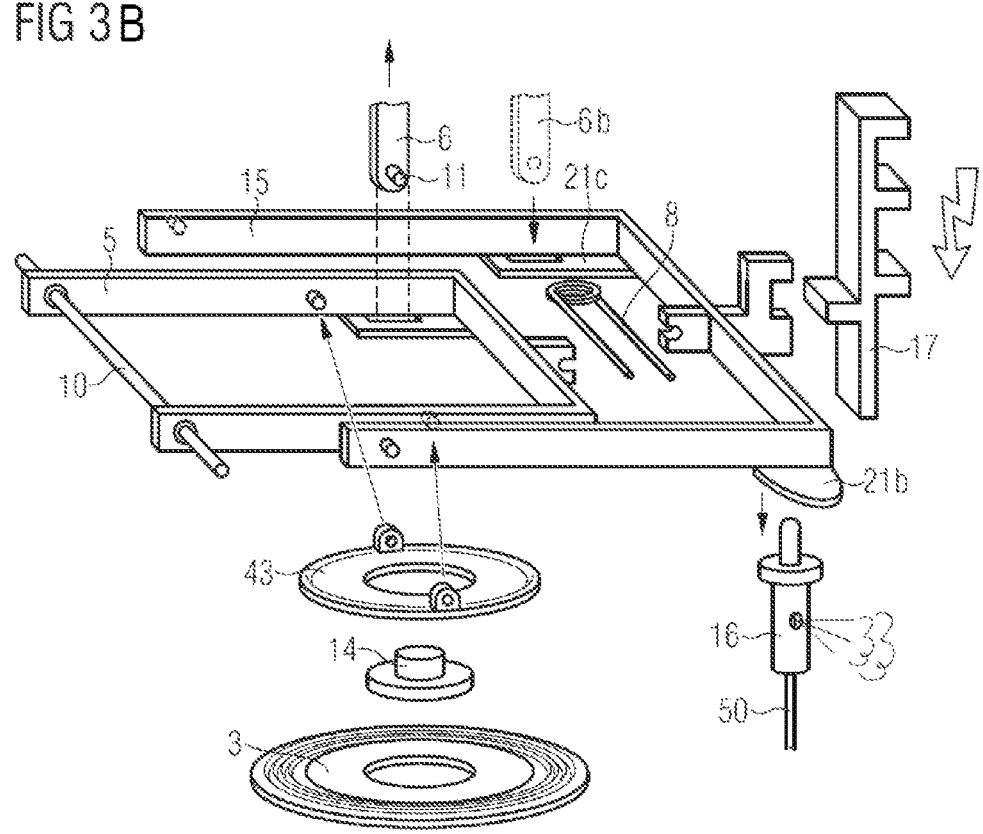

FIG. 3b shows a possible embodiment in which the snap arm 15 is permanently mounted on the housing.

FIG. 4 shows a plant 60 with a media container 61 passing a medium through pipes 73 to ports 62 to which QR codes 63 are attached. When scanning these QR codes with a mobile device 64, data or queries 77 may be sent to other networks 68 or cloud servers 69 (e.g., external servers) via routers 65, APL (Advanced Physical Layer) or OPC-UA or via wireless stations 66, 67 (e.g., communication units). Data from level, pressure, sunlight or temperature sensors 78 connected to transmitters 76 may also be transmitted over such networks 68, including, of course, using other wired networks in parallel with wireless networks.

Such data could also help to save energy by switching devices, such as compressors 72, when sunlight or other energy is harvested via collectors 74, stored in power supply 75, and converted into, e.g., compressed air, or by switching on the compressor 72 via the intelligent pressure-actuated switch 1, 71 shown here. For this purpose, another differential plate 6b engages via a bracket 21c within the pressure-actuated switch 1, 71, which is actuated by an electric magnetic mechanism or other device known to one skilled in the art. In particular, the snap arm 15 and the actuator plate 5 can have the bracket 21c, and the differential plate 6 or the another differential plate 6b is engaged with the bracket 21c. The compressed air is then stored until a user 79 wishes to use the compressed air from the port 62, e.g., for a spray gun 80. The switch-on and switch-off times can also be controlled by the data center 70 or by the user 79 via a mobile device, such as a mobile phone 64.

Data delivered via a connection to cloud data linked to a QR code can also combine optimized forecast data with weather information to assist the user 79 in terms of the stored medium or optimized availability. The user 79 can also be informed at what optimal time the medium will be made available to the user 79 in the most favorable manner.

The level or pressure of the medium could also be optimized or billed over the usage time stored in the cloud server 69. In particular, billing to a customer or the user 79 could be done via the stored cycle time of the compressor 72 in the pressure-actuated switch 1, 71.

It is also conceivable that the pressure switch is not mechanically actuated via a diaphragm, but via an external, electronic pressure sensor. In this case, the housing could then be encapsulated pressure-tight as a field device with a switching function. An implemented software can then map a switching characteristic that a user has previously configured and stored there.

The intelligent pressure-actuated switch 1,71 could also measure a temperature or overheating of the compressor 72 with an external temperature sensor. This can have an impact on the service life of the compressor 72 and thus the cycle times for cooling can also be optimized. A reconversion of air into voltage or energy could also be carried out via cloud management based on the data supplied by the pressure-actuated switch 1, 71.

In a further example, the pressure-actuated switch 1, 71 can be regarded as a field device and is specially equipped either by cable or with a radio link based on 2014/53/EU or (EU) 2022/30 or EU 765/2008 or EU 768/2008, in particular for cyber resilience requirements. For normal operation, the pressure-actuated switch 1, 71 regularly queries a security status from a data center 70, from a cloud server 69. If the security server in the data center or the cloud server 69 is not reachable or if it issues a code for a critical state, the pressure switch goes into a previously defined and configured safety state stored on site in the device, which enables, for example, normal operation of the connected devices. In order to reset the communication and operation in normal mode, the pressure switch and the data center, the security server, exchange a security code that has previously been stored securely on both sides to ensure authentication of the return order in normal mode. Alternatively, this can be controlled on site by the user 79 via a mobile device, such as a mobile phone 64, or via a reset button.

The pressure-actuated switch 1, 71 can be equipped with a pressure sensor and, as an intelligent field device with switching function, is equipped to communicate with other sensors and other field devices. Among other things, it can use level sensors for compressed air lubricators or compressed air dehumidifiers to transmit a comprehensive status of a compressed air supply system to a control room and also send requests for refilling media such as oil to a server or end user via push message.

In another example, the pressure-actuated switch 1, 71 is wirelessly connected to at least two independent servers. For example, cyclic communication, i.e., a cyclic exchange of information in the form of data packets, is provided between the pressure-actuated switch and the at least two servers. It may be provided that the pressure-actuated switch 1, 71 sends a newly defined verification number, a verification code, each time data packets are sent, which must be independently confirmed by the at least two servers.

In a further example, the verification code is generated by a crypto generator, a crypto unit used to encrypt the data transmission at transmitter and receiver. Another component for further encryption can also be a hardware-based key, which is stored for access by the encryption algorithm.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A pressure-actuated switch comprising:
a pressure port;
a diaphragm;
a range spring;
an actuator plate;
a differential plate; and
an electrical switch,
wherein a certain pressure level at the pressure port moves the diaphragm against the range spring and thus deflects the actuator plate,
wherein the actuator plate is coupled to the electrical switch via a snap spring,
wherein the electrical switch is adapted to be switched on or off via the deflection of the actuator plate and/or a snap arm and the snap spring,
wherein the differential plate controlled by a differential spring is connected to the actuator plate or the snap arm and supports the actuator plate in a first portion of movement, and
wherein the differential plate is decoupled from the actuator plate in a second portion of movement of the actuator plate.

2. The pressure-actuated switch according to claim 1, wherein the actuator plate has an outer axis, wherein the range spring and the pressure at the pressure port act via the diaphragm and/or a piston at a first position of the actuator plate, wherein the differential plate engages on the actuator plate at a second position, and wherein the first position is closer to the outer axis than the second position.

3. The pressure-actuated switch according to claim 1, wherein the differential plate engages with the actuator plate via a differential rivet pin, which is decoupled from the actuator plate in one position of the pressure-actuated switch.

4. The pressure-actuated switch according to claim 1, wherein the differential plate has a free area, wherein a differential stop engages in the free area, and wherein movement of the differential plate is limited by the differential stop or a differential stop screw or an adjusting screw that rests in an adjustable stop position on a protrusion of the differential plate.

5. The pressure-actuated switch according to claim 1, wherein the differential plate is movable by the differential spring, and wherein an elongation of the differential spring is settable by a differential spindle.

6. The pressure-actuated switch according to claim 1, wherein an actuation pressure is adjustable via compression exerted by a range spindle on the range spring.

7. The pressure-actuated switch according to claim 1, wherein the actuator plate is surrounded by the snap arm of the electrical switch.

8. The pressure-actuated switch according to claim 7, wherein the snap arm of the pressure-actuated switch has a bracket and the differential plate or another differential plate is in engagement or is brought into engagement with the bracket.

9. The pressure-actuated switch according to claim 1, wherein the snap arm is U-shaped.

10. The pressure-actuated switch according to claim 1, wherein the actuator plate is U-shaped.

11. The pressure-actuated switch according to claim 1, wherein a relief valve is held by a bracket as part of the snap arm during the switching of the electrical switch.

12. The pressure-actuated switch according to claim 1, wherein the actuator plate of the pressure-actuated switch has a bracket and the differential plate or another differential plate is in engagement or is brought into engagement with the bracket.

13. An intelligent field device with at least one switching function, the device comprising:
a pressure-actuated switch according to claim 1;
a power supply; and
a communication unit which is designed to exchange data with one or more external servers independently of each other,
wherein in a data transmission from the intelligent field device to the at least one server, at least one verification code is attached or a verification code is processed, or a previously defined security code is regularly queried or verified between the transmitting/receiving points.

14. A method for the safe operation of an intelligent field device having at least one switching function, the method comprising:
providing a pressure-actuated switch according to claim 1;
providing a power supply;
providing a communication unit which is designed to communicate with one or more external servers to exchange data independently of each other;
sending, during a sending process, measured values in the form of defined data packets to at least one server;
attaching at least one verification code to each data packet during the sending process or encrypting or processing the data packet with a verification code, wherein the verification code is generated by a number generator or by a crypto unit with a second hardware-based key in the electronic unit; and
verifying the at least one verification code by the at least one server, and then passed on to a higher-level control room with a positive inspection characteristic.

15. The method for the reliable operation of an intelligent field device having at least one switching function according to claim 14, wherein the intelligent field device communicates with at least two independent servers, and wherein a verification code is attached to each data packet in each sending operation or the data packet is encrypted with a verification code, wherein during communication with the one first server, the verification code remains unchanged for each sending operation, wherein, during communication with the one second server, the verification code is regenerated by the crypto generator for each sending process, wherein both verification codes are confirmed independently of each other by the at least two servers, wherein the verification codes confirmed by the servers are compared in the electronic unit, and wherein, when a faulty and/or missing confirmation of at least one server occurs, the intelligent field device switches to safe operation and/or prevents communication with the faulty server.

* * * * *